United States Patent [19]

Whittle

[11] Patent Number: 4,887,199

[45] Date of Patent: * Dec. 12, 1989

[54] START CIRCUIT FOR GENERATION OF PULSE WIDTH MODULATED SWITCHING PULSES FOR SWITCH MODE POWER SUPPLIES

[75] Inventor: Rex W. J. Whittle, Kowloon, Hong Kong

[73] Assignee: Astec International Limited, Hong Kong

[*] Notice: The portion of the term of this patent subsequent to Sep. 22, 2004 has been disclaimed.

[21] Appl. No.: 99,532

[22] Filed: Sep. 22, 1987

Related U.S. Application Data

[63] Continuation-in-part of Ser. No. 827,808, Feb. 7, 1986, Pat. No. 4,695,936.

[51] Int. Cl.$^4$ .......................................... H02M 3/335
[52] U.S. Cl. .......................................... 363/49; 363/21
[58] Field of Search ................................ 363/2, 21, 49

[56] References Cited

U.S. PATENT DOCUMENTS

| | | | |
|---|---|---|---|
| 4,063,307 | 12/1977 | Stephens | 363/21 |
| 4,164,014 | 8/1979 | Crowe et al. | 363/49 |
| 4,246,634 | 1/1981 | Purol | 363/19 |
| 4,461,980 | 7/1984 | Nilssen | 363/132 |
| 4,695,936 | 9/1987 | Whittle | 363/21 |

FOREIGN PATENT DOCUMENTS

| | | | |
|---|---|---|---|
| 0190493 | 8/1986 | European Pat. Off. | |
| 51475 | 8/1983 | Japan | 363/49 |
| 194757 | 10/1985 | Japan | 363/49 |
| 88765 | 5/1986 | Japan | |
| 190493 | 8/1986 | Japan | 363/49 |

Primary Examiner—William H. Beha, Jr.
Attorney, Agent, or Firm—McCubbrey, Bartels, Meyer & Ward

[57] ABSTRACT

A start circuit for starting the generation of pulse width modulated switching pulses is disclosed for use in a DC/DC switching converter power supply. The starting circuit is responsive to the initiation of a DC voltage source and starts the operation of a pulse generator. The starting circuit also includes a relaxation oscillator connected to the DC voltage source for periodically generating a start pulse at a predetermined frequency. Ongoing power is coupled to the pulse generator once the generator begins operation. The relaxation oscillator is selectively disabled when the pulse generator is powered by the ongoing power supplied by the power supply during normal operation. The start circuit further includes a delay function for delaying the disabling of the relaxation oscillator for a preselected period after shutdown of the power supply and includes a rapid start function for reducing the time between restoration of input power and the operation of the start circuit.

10 Claims, 8 Drawing Sheets

START CIRCUIT FOR GENERATION OF PULSE WIDTH MODULATED SWITCHING PULSES FOR SWITCH MODE POWER SUPPLIES

BACKGROUND OF THE INVENTION

This is a continuation-in-part of patent application Ser. No. 827,808, now U.S. Pat. No. 4,695,936, issued Sept. 22, 1987.

The present invention relates to switching mode power supplies and more particularly to start circuits for starting the generation of pulse width modulated switching pulses.

Switching mode power supplies for converting a first DC voltage to a second DC voltage are commonly used to power electronic systems from an alternating current voltage source. Such power supplies are generally used because of their relatively low cost and because they can operate at frequencies above 20 kHz, thereby enabling the use of much smaller and lighter power transformers, coils, and filter capacitors. The control circuits for such power supplies usually include a pulse generator or oscillator which generates a series of pulse width modulated pulses. These pulses are used to control the duration of applications of the DC input voltage across the power transformer in a single ended power supply.

In general, a conventional switching power supply includes a DC voltage source which is normally derived from an alternating current line via a rectifier, a power transformer including a primary winding and at least one secondary winding, a pulse generator for generating a train of pulses of varying pulse width as a function of the present value of the output voltage, and a transistor switch in series between the DC voltage source and the primary winding of the power transformer. This transistor switch is controlled by the pulses generated by the pulse generator such that the switch closes for the duration of each said pulse. The pulse generator monitors the output DC voltage generated by the power supply, compares this voltage to a fixed reference voltage, and either expands the pulse width of the pulse generator feedback pulse to raise the output voltage, or narrows the pulse width of this pulse to generate a lower DC output, to thereby maintain the output DC voltage at a prescribed predetermined voltage level. A rectifier and filter circuit is also connected to the secondary winding for generating the output DC voltage. Such feedback of the output DC voltage is necessary since otherwise the output voltage would vary as a function of the varying demand of the load being powered by this output voltage.

The two standard types of switching power supplies are boost (step-up) and buck (step-down) power supplies. The conventional boost switching power supply is also called a flyback power supply or flyback converter. In such power supplies, energy is stored in the power transformer when the power switch is on and then delivered from the transformer out to the load when the switch is off. More specifically, when the transistor power switch is conducting, current increases at a linear rate through the primary of the power transformer, which behaves like an inductor by storing energy in its core. As soon as the switch is cut off, the flux in the transformer core decreases, permitting the current to flow in the secondary circuit. This current charges an output capacitor as well as feeds power to the output load. The pulse width modulating pulse generator compares the output voltage with a fixed reference voltage for generation of the feedback pulse width modulated pulse.

Conventional buck power supplies include forward converter power supplies which operate in a similar manner to flyback power supplies except that a separate inductor on the secondary side of the power transformer is used to store energy rather than the power transformer. In this case, when the switching transistor is on, as current flows through the primary winding, current is also caused to flow from the secondary winding through a diode rectifier into an inductor and out to the output load. When the transistor is off, this inductor continues to provide current flow to the output load.

Both types of above described power supplies generally require some sort of start circuit to initiate the pulse width modulated pulse train needed to control the transistor power switch. A number of such start circuits are known in the art, but all of them have disadvantages where one desires to maintain the pulse generator isolated on the secondary side of the power supply. Maintaining isolation in a power supply between its primary winding and its secondary winding sides is necessary in many applications. In such supplies, the secondary side of the supply must be kept completely electrically isolated from the primary side. It is a common requirement, for example, that commercial isolated power supplies be able to withstand a 5,000 volt power surge without breakdown. Transformers having insulation between their primary and secondary windings, or opto-isolators, are used to provide such isolation. Transistor switches or other such semiconductor devices cannot be used for this L purpose, since their breakdown voltage may only be of the order of 50-100 volts. A key problem in such isolated power supplies is how to power a pulse generator isolated from the primary side, especially when the power supply is being initially powered up when the pulse generator has not yet begun to regulate the output DC voltage.

One prior art solution to providing power to a pulse generator, while maintaining the isolation of the pulse generator means on the secondary side, was to couple a second power source across a second isolating transformer to the pulse generator This is a complex and expensive solution to the problem.

Another solution was to position the pulse generator on the primary side and only generate the output DC voltage error signal on the secondary side of the power transformer This error signal was then coupled across an isolator back to the primary side The drawback of this solution is two fold. First, it is difficult to couple a DC level across an isolator, since either the error signal level needs to be converted into a pulse, as required by an isolation transformer, or a more expensive opto-isolator must be used. In addition, this solution requires that control circuitry be duplicated on both the primary and secondary sides of the power transformer.

A third and probably least desirable solution was to position the pulse generator on the primary side and have it monitor the primary winding voltage in an attempt to control the output voltage level. This solution presumes that the voltage on the output of the secondary will reflect or be a function of the voltage on the primary, but this is not necessarily the case, depending on the rate of change of the power supply's output load.

A recent prior art reference, U.S. Pat. No. 4,246,634, illustrates how difficult it is to successfully design an isolated power supply with a pulse generator on the secondary side of the isolated power supply. The invention disclosed in this reference purports to provide such an isolated supply but it fails in two respects. First, although the pulse generator is powered from a secondary winding, the voltage being monitored is not the output voltage. Rather, the monitored voltage is the same voltage that is generated by the secondary winding used to power the pulse generator. A different secondary winding couples energy to the output load. More importantly, the start circuit used in this prior art reference to initially power the pulse generator on power supply start-up couples power directly to the pulse generator. No high voltage isolation is provided. Once the pulse generator start circuit is operating normally, it is isolated from the pulse generator merely by a transistor that has been turned off. Such a circuit is susceptible, as described above, to high voltage noise spikes or other interference.

It is also undesirable for the start circuit of a power supply to generate pulses continuously. For example, when the power supply is running normally, the continued operation of the start circuit could generate extraneous pulses which interfere with normal supply operation. Also, the circuit being powered by the power supply may require that the circuit be restarted as soon as possible. On the other hand, the user may determine that, should a fault condition develop, the power supply start circuit should not be enabled to operate until after a subsequent indication that the fault has been eliminated. And it may also be advantageous to provide means for delaying operation of the start circuit while retaining its automatic character.

What is therefore needed is a means for powering an isolated pulse generator for a single ended switching power supply of the buck or boost type. The pulse generator must be initially powered on the secondary side by means of a start circuit on the primary side and thereafter powered from the secondary side once normal power supply operation is initiated.

The start circuit must be designed so as to be capable of being selectively disabled and should be adapted to allow incorporation of delay means for delaying operation of the start circuit following shutdown of the power supply. Preferably, the subject circuit should be adapted also to allow incorporation of rapid start means.

SUMMARY OF THE INVENTION

A principal object of the present invention is to provide means for delaying attempts by a start circuit to restart a switching power supply after the power supply has shut down.

Another object of the present invention is to provide means for disabling the start circuit once the switching power supply begins normal operation.

A further object of the present invention is to provide means for preventing the start circuit from restarting the switching power supply until input power has been removed and later reapplied to the power supply.

Yet another object of the present invention is to provide means for rapidly starting the power supply.

The present invention can be summarized as a start circuit for a DC/DC switching converter power supply which includes a DC voltage source, a power transformer including a primary winding and a secondary winding, rectifier and filter means connected to the secondary winding for generating an output DC voltage from the current output by the secondary winding, pulse generator means for generating a train of pulses of varying pulse width as a function of the present value of said output voltage, switch means coupled to the primary winding such that when the switch means closes, the DC voltage source is coupled across said primary winding, and means for coupling the train of pulses to the switch means. The pulses cause the switch means to close for the duration of each pulse. The start means is responsive to the initiation of said DC voltage source and starts the operation of the pulse generator means. The start means includes relaxation oscillator means connected to the DC voltage source for periodically generating a start pulse at a predetermined frequency, means for coupling the start pulse to the switch means, the start pulse causing said switch means to close for a predetermined duration, means connected to the secondary winding for powering the pulse generator means, means for coupling ongoing power to the pulse generator means once the pulse generator means begins operation, and disabling means for selectively disabling the relaxation oscillator when the pulse generator means begins to be powered by the ongoing power supplied by the power supply during normal operations. To provide this function, a separate circuit on the secondary side of the power supply couples ongoing power to the pulse generator.

The start circuit may further include delay means coupled to the disabling means for delaying electrical removal of the disabling means from the start circuit for a preselected period after shutdown of the power supply.

The start circuit may also include latch means for turning off the disabling means, and rapid start means for reducing the time between restoration of input power and operation of the start circuit.

DETAILED DESCRIPTION OF THE PREFERRED EMBODIMENT

Figure 1:
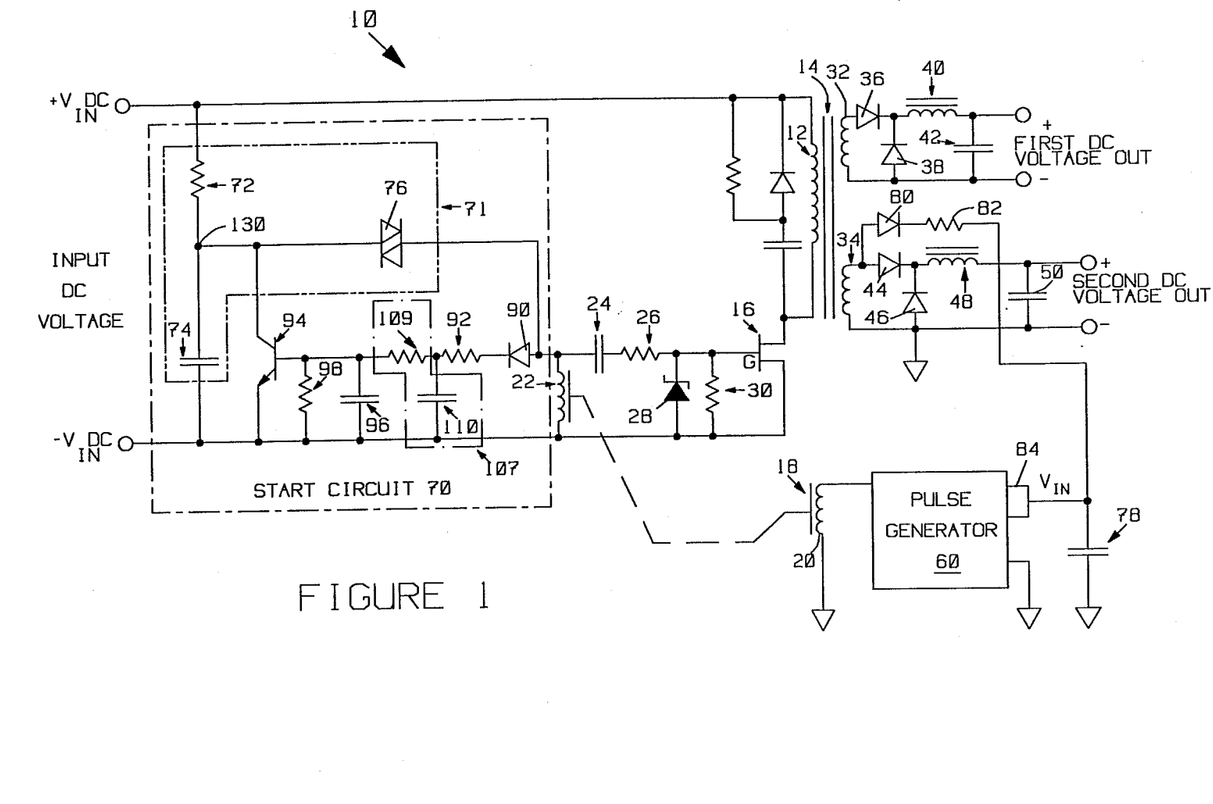
FIG. 1 is a diagram of one embodiment of the present invention showing start circuit disabling means and delay means.

A conventional DC/DC converter power supply including a start circuit according to the present invention is shown at 10 in FIG. 1. Although FIG. 1 illustrates a forward converter type switching power supply, other switching power supply topologies may include a start circuit according to the present invention.

The input DC voltage is applied to power supply 10 at its input terminals, shown as +VDC IN and −VDC IN. This input DC voltage is coupled to a series circuit comprising the primary winding 12 of a power transformer 14 and a power switch 16. Switch 16 provides switch means for coupling the DC input voltage across primary winding 12, and is preferably a 500 volt power field effect transistor (FET) having an on resistance of 4 to 6 ohms. The primary side of power supply 10 is shown to the left of power transformer 14 in FIG. 1 and the secondary side of power supply 10 is shown on the right of transformer 14.

Gate drive for switch 16 in normal operation is provided from the secondary side of power transformer 14 via an isolation transformer 18. Transformer 18 is constructed with the necessary safety isolation to isolate the primary winding 20 of said transformer 18, from its secondary winding 22. Primary winding 20 is on the secondary side of power supply 10 and secondary winding 22 is on the primary side of power supply 10. Secondary winding 22 is connected to the gate G of switch 16 via a capacitor 24 and a resistor 26. Capacitor 24 is preferably a 100 nanofarad capacitor. Resistor 26 is used to slow down slightly the switching speed of switch 16 to reduce electromagnetic interference. DC restoration of the switch 16 gate is provided by a zener diode 28. Resistor 30 is used to discharge capacitor 24 and hold the gate of switch 16 to common ($-$VDC) in the absence of drive current from winding 22.

As seen in FIG. 1, the secondary side of transformer 14 includes two secondary windings 32 and 34. Each winding is constructed in a conventional manner to provide a first DC output voltage and a second DC output voltage, respectively, after rectification and filtering of the outputs of secondary windings 32, 34. First with regard to secondary winding 32, the output of this winding is rectified via diodes 36 and 38 and then coupled through an inductor 40 to an output filtering capacitor 42, which is connected across the output plus and minus terminals of the first DC voltage output line. The output of secondary winding 34 is rectified via diodes 44 and 46 and then coupled through an inductor 48 to an output filter capacitor 50, which is connected across the output plus and minus terminals of the second DC output voltage. As will be described in greater detail below, this second DC output voltage is also used to power pulse generator 60.

Pulse generator 60 monitors the value of the second output voltage and generates a train of pulse width modulated pulses representative of the variation of said output voltage from a reference voltage source. These pulses are coupled via isolation transformer 18 to the gate of switch 16, as described above.

In operation of a conventional forward converter power supply 10, when switch 16 closes, current is coupled across transformer 14 and into inductors 40 and 48 for generating the output first and second DC voltages, respectively. The second DC voltage output is monitored by pulse generator 60, which generates a train of pulses which are pulse width modulated as a function of the present level of the second DC output voltage. These pulses are fed back to switch 16 via isolation transformer 18 and cause transistor switch 16 to close for the duration of each said pulse generated by pulse generator 60. The resultant output DC voltage is therefore regulated at a desired voltage level as a function of the reference voltage in pulse generator 60.

A novel start circuit according to the present invention is shown at 70 in FIG. 1. Included in this start circuit is relaxation oscillator means 71 connected to the DC voltage source for periodically generating a start pulse at a predetermined frequency. This relaxation oscillator means includes a resistor 72, a capacitor 74, and a diac 76. In operation, capacitor 74, preferably a 10 nanofarad capacitor, is charged by resistor 72, a 100K resistor, until capacitor 74 reaches a voltage corresponding to the breakdown voltage of diac 76. Preferably, this is about 30 to 32 volts. When the diac 76 breaks down, it discharges capacitor 74 into the gate of FET switch 16 which charges up the gate capacitance. This voltage on the gate of switch 16 causes switch 16 to turn on for the duration of the charge pulse. Transistor 16 thereafter goes off until capacitor 74 again charges up to the breakdown voltage of diac 76. This periodic charging and switch turn on process continues until the pulse generator 60 on the secondary side of power supply 10 starts normal operation and begins driving switch 16 via isolation transformer 18.

Means are also connected to secondary winding 34 for powering the pulse generator means 60 initially until pulse generator 60 begins normal operation. The above described closure of transistor switch 16 as a function of the charge coupled to it from capacitor 74 provides a source of incremental energy output from secondary winding 34. This incremental energy is coupled to an energy storage means comprising capacitor 78 so that the energy is coupled to capacitor 78 via a diode 80 and resistor 82. Diode 80 and resistor 82 rectify the current out of secondary winding 34 and couple it to capacitor 78. Capacitor 78 is coupled across the VIN power input and common return of pulse generator 60. During startup, pulse generator 60, which is preferably a conventional integrated circuit such as a Unitrode 3842 feedback control device, ordinarily takes a very low quiescent current. This is due to the operation of a low voltage lock-out circuit 84 in this particular integrated circuit which prevents higher input current from flowing into pulse generator 60 until sufficient voltage appears at VIN. Note that insufficient power is available from diode 80 and resistor 82 to continue powering pulse generator 60. Once capacitor 78 charges up to a sufficiently high voltage, this low voltage lock-out circuit 84 in pulse generator 60 senses this voltage and allows capacitor 78 to couple this energy into pulse generator 60, thereby providing initial power thereto sufficient to enable pulse generator 60 to begin operation.

For example, if capacitor 78 is a 100 microfarad capacitor, it takes approximately 10 milliseconds for it to charge down from 16 volts to 10 volts, while providing 40 to 100 milliamps of power for pulse generator 60. The lock-out circuit 84 provides a hysteresis effect wherein it turns on when the voltage rises to 16 volts and does not turn off until the input voltage drops below 9 volts. Other voltages can also be used.

Once pulse generator 60 begins operation, power is supplied to the VIN terminal of pulse generator 60 via conventional operation of diodes 44 and 46 and inductor 48. Once normal power is being coupled to pulse generator 60 via diodes 44, 46 and inductor 48, resistor 82 limits the amount of energy coupled through diode 80.

In operation of the start circuit according to the present invention, the relaxation oscillator means 71 generates a pulse of approximately 2 microseconds in pulse width every 200 microseconds. The 200 microsecond timing is controlled by the RC time constant of resistor 72 and capacitor 74. With these pulses being coupled as energy to capacitor 78 via secondary winding 34, it takes between 10 and 100 milliseconds for the capacitor 78 to charge up sufficiently to overcome the low voltage lock-out circuit 84 and provide initial power to generator 60. Further discussion of this operation is given with reference to FIGS. 2A and 2B below.

A disabling means is also provided for disabling start circuit 70 operation once normal operation of pulse generator 60 has been initiated. This means includes a diode 90, a transistor 94 and a resistor 92 connected in series to the base of transistor 94. A capacitor connecting the base of transistor 94 to the common return line is shown at 96.

In operation, once transistor 16 is operating in its normal mode from gate drive provided by pulse generator 60 sufficient additional gate drive is available to drive the base of transistor 94 thereby turning transistor 94 on. Once transistor 94 turns on, further operation of the start circuit 70 is disabled.

More specifically, as can be seen, the current provided by the drive transformer 22 is coupled through diode 90 through resistor 92 and begins to charge up capacitor 96. Once capacitor 96 has been charged up to a sufficient voltage to turn on transistor 94, transistor 94 goes on. During normal operation, sufficient current continues to be coupled through diode 90 and into the base of transistor 94 to maintain transistor 94 on. The RC time constant of capacitor 96 and resistor 92 is chosen to ensure transistor 94 remains off during each interval during normal supply operations when no current is flowing from drive line 22. That is, capacitor 96 and resistor 92 act to couple the average value of voltage across winding 22 to the base of transistor 94. Once transistor 16 ceases to periodically switch on, insufficient current is provided to maintain transistor 94 on and so it goes off, thereby re-enabling start circuit 70 to again provide start pulses to the gate of switch 16. A resistor 98 may also be provided to ensure that capacitor 96 does not charge up sufficiently to turn on transistor 94 until normal operation of the power supply 10 has been initiated.

The start circuit 70 of the embodiment shown in FIG. 1 also includes delay means 107 for delaying operation of start circuit 70 after shutdown of power supply 10 for circuit faults or for other reasons. The delay is advantageous in that it separates start attempts by a predetermined time period, typically one-tenth to one-half of a second. As described below, this time period is much longer than the time constant provided by capacitor 96. Because start attempts dissipate some energy in the circuit components, the long delay time enables minimization of power dissipation under fault conditions such as a short circuit on the output during which time the power supply would otherwise continuously attempt to restart.

Delay means 107 accomplishes this by delaying the removal of the disabling operation of the transistor 94, as described above, which disables relaxation oscillator means 71 when power supply 10 is in normal operating mode.

FIG. 1 shows delay means 107 comprising a resistor 109 and a capacitor 110. Delay means 107 prevents the operation of start circuit 70 after shutdown of power supply 10 for a predetermined length of time. In operation, if power supply 10 shuts down for any reason, including the existence of fault conditions such as overcurrent, over-voltage, or over-temperature, pulse generator means 60 will cease generating a train of pulses to drive secondary winding 22 of isolation transformer 18. The base of switch 16 also will not be driven and switch 16 will turn off.

Because capacitor 110 was charged during normal operation of power supply 10, it will discharge after power supply 10 goes off through resistor 109 into the base of transistor 94 and through resistor 98. The charge decreases until the base of transistor 94 is no longer sufficiently driven to stay on and it turns off, thereby removing the coupling of resistor 72 to ground. This reenables operation of relaxation oscillator means 71. The time delay between the shutdown of power supply 10 and an attempted restart of the supply is determined by the RC time constant of resistor 109 and capacitor 110. This time constant is substantially larger than the time constant provided by capacitor 96.

Figure 2A:
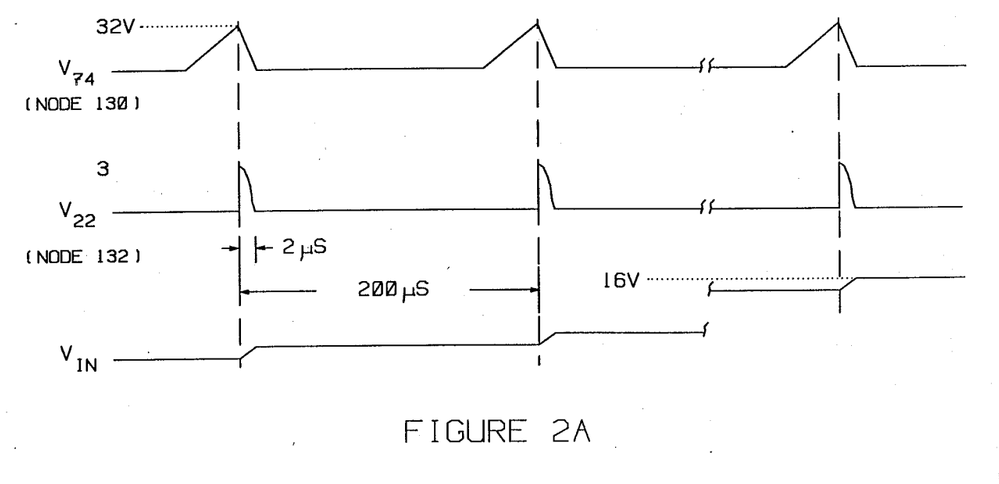
FIGS. 2A and 2B are timing diagrams for the embodiment of the present invention shown in FIG. 1.
Figure 2B:
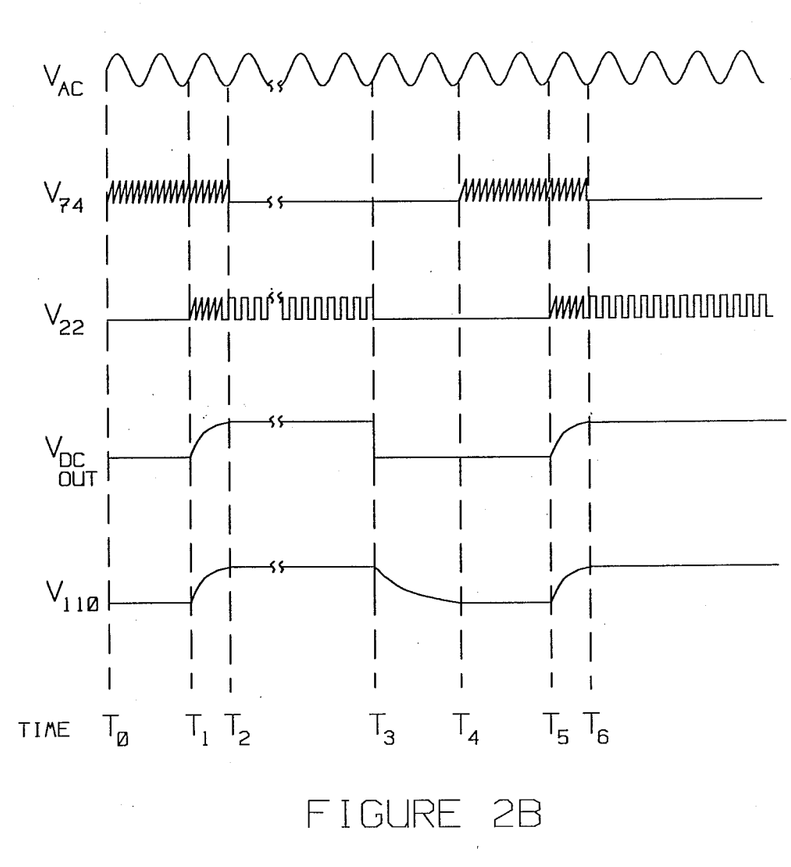

The operation of the embodiment of the present invention shown in FIG. 1, including delay means 107, may be demonstrated by reference to FIG. 1 and to the timing diagrams of FIGS. 2A and 2B.

FIG. 2A illustrates how the voltage $V_{IN}$ at pulse generator 60 increases with each oscillation of relaxation oscillator 71. FIG. 2B illustrates the operation of the FIG. 1 delay means 107 starting with supply 10 off at $T_o$. An AC voltage is presented to be rectified for applying $V_{DC}$ to power supply input. Once the increasing voltage $V_{74}$ across capacitor 74 exceeds the breakdown voltage of diac 76, oscillation of relaxation oscillator 71 begins. At $T_1$, pulse generator 60 begins to generate a train of pulses which are coupled to isolation transformer 18. As described above in reference to FIG. 1, the voltage $V_{22}$ across secondary winding 22 of transformer 18 causes generation of power supply output voltage VDC OUT via power transformer 14. The pulses on secondary winding 22 also causes capacitor 110 of delay means 107 to charge up, as indicated as $V_{110}$. At $T_2$, when capacitor 110 has charged sufficiently, transistor 94 of disabling means 89 turns on, short circuiting capacitor 74 and thereby stopping the oscillation of start circuit 70.

At $T_3$, a fault condition occurs in power supply 10. This could be the result, e.g., of a short circuit on the output of power supply 10. The fault causes pulse generator 60 to shut off, thereby dropping the voltage $V_{22}$ on the secondary winding 22 of isolation transformer 18 to zero. This results in the discharge of capacitor 110 of delay means 107 through resistor 109, resistor 98, and transistor 94. At $T_4$, the voltage $V_{110}$ has sufficiently decreased to allow transistor 94 to turn off, thereby removing the short circuit of capacitor 74. Capacitor 74 is then enabled to charge up relaxation oscillator 71 begins again to oscillate to start power supply 10. At $T_5$, pulse generator 60 begins generating a train of pulses on isolation transformer 18 and capacitor 110 again begins to charge. At $T_6$, capacitor 110 has again charged sufficiently to cause transistor 94 to switch on, stopping the oscillation of start circuit 70. The delay time is from $T_3$ to $T_4$.

Figure 3:
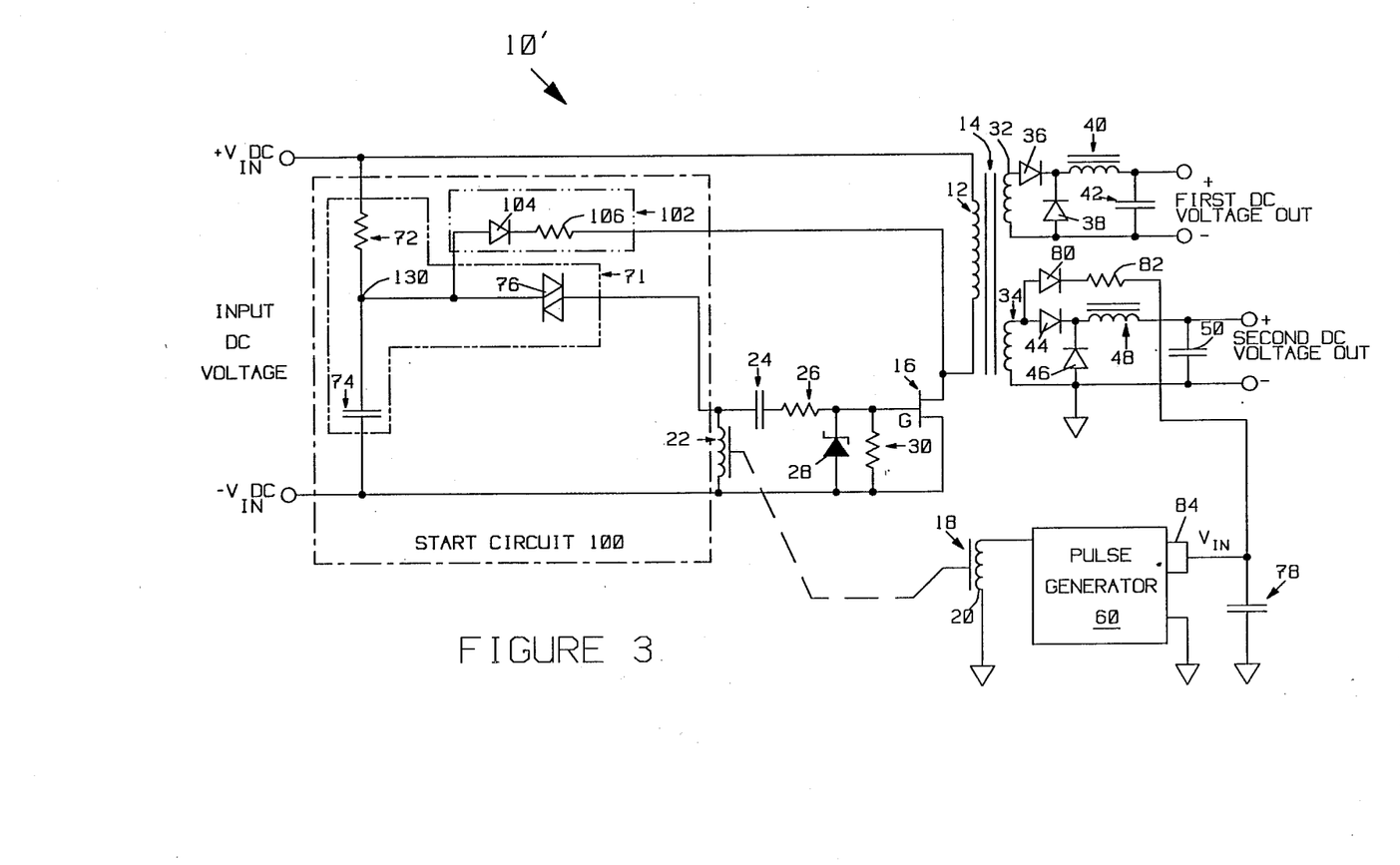
FIG. 3 is a diagram of another embodiment of the present invention showing an alternative start circuit disabling means.

FIG. 3 is a schematic diagram showing another embodiment of a start circuit 100 for a power supply 10' of the present invention providing alternative disabling means 102 for disabling the start circuit 100 when power supply 10' is in its normal operating mode. Components that are common to FIG. 1 and FIG. 3 are shown with the same number.

As shown in FIG. 3, input DC voltage is applied to the input terminals, shown as +VDC IN and VDC IN, and is coupled to a series circuit comprising primary winding 12 of power transformer 14 and a power switch 16. Switch 16 preferably is a 500 volt power field effect transistor (FET) having an on resistance of 4–6 ohms.

When power supply 10' is in normal operating mode, the gate drive for gate G of switch 16 is provided from the secondary side of power transformer 14 via pulse generator means 14 and isolation transformer 18. Secondary winding 22 is coupled to gate G of power switch 16 by capacitor 24 and resistor 26. DC restoration of gate G of switch 16 is provided by zener diode 28. Resistor 30 discharges capacitor 24 and holds gate G of switch 16 to common ($-VDC$) in the absence of a drive current from secondary winding 22.

During normal operation, pulses of drive current from secondary winding 22 cause switch 16 to close for the duration of each pulse, thereby enabling pulses in primary winding 12 of power transformer 14 to regulate the output DC voltage of power supply 10' as a function of the reference voltage and pulse generator means 60 which provides a train of pulses to isolation transformer 18.

FIG. 3 also shows relaxation oscillator means 71 connected to the DC voltage source for periodically generating start pulses at a predetermined frequency. Relaxation oscillator means 71 includes resistor 72, capacitor 74, and diac 76.

Alternative disabling means 102 of FIG. 3 includes a diode 104 whose anode is connected to the electrical junction of resistor 72, capacitor 74, and diac 76 of relaxation oscillator means 71, and a resistor 106 connected in series between the cathode of diode 104 and the drain D of power switch 16.

When power supply 10' is in normal operating mode, wide duty cycle pulses are driven from secondary winding 22 onto gate G of power switch 16, turning on switch 16. In this condition, the drain D of switch 16 goes essentially to ground and pulls the charge from capacitor 74 via diode 104. Resistor 106 limits current discharging from capacitor 74 and acts as an integrator so that the RC time constant of resistor 106 and capacitor 74 is disabled from responding to narrow duty cycle pulses that are present during start operations. By responding to the wide duty cycle pulses on drain D during normal operations, alternative disabling means 102 continues to discharge capacitor 74, thereby keeping its charge below the avalanche voltage of diac 76, thereby disabling start circuit 100 from attempting to start power supply 10.

The operation of the embodiment of the present invention shown in FIG. 3, including alternative disabling means 102, may be explained by reference to FIG. 3 and to the timing diagram of FIG. 4.

Figure 4:
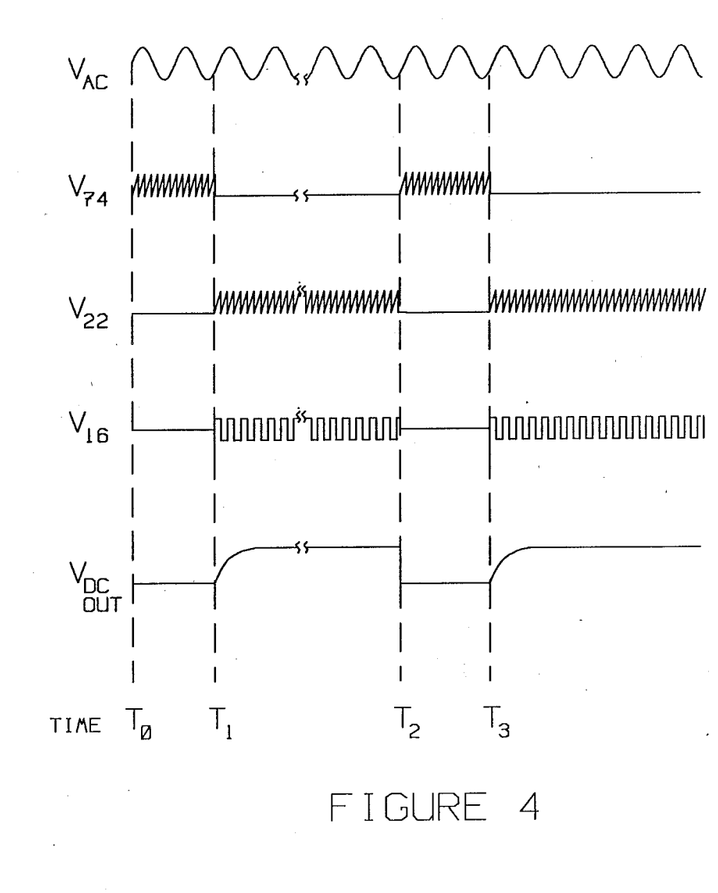
FIG. 4 is a timing diagram for the embodiment of the present invention shown in FIG. 3.

As seen in FIG. 4, with power supply 10' off at $T_o$, an AC voltage is rectified and applied to the power supply input. The voltage $V_{74}$ across capacitor 74 beings oscillation of relaxation oscillator 71 as described above in reference to FIG. 1. During operation of start circuit 100, the drain of switch 16 is periodically switched to ground at a very low duty rate, typically 2%. Resistor 106 limits the amount of charge thereby pulled from capacitor 74, so that capacitor 74 is not prevented from charging to the avalanche voltage of diac 76.

At $T_1$, pulse generator 60 begins to generate a train of pulses which are coupled to isolation transformer 18. As described above in reference to FIG. 1, the voltage $V_{22}$ across secondary winding 22 of isolation transformer 18 causes generation of power supply output voltage VDC OUT via power transformer 14. During this normal operation of power supply 10', the drain of switch 16 is periodically switched to ground at a high duty rate, typically 20-50%. The variation of voltage $V_{16}$ at the drain of switch 16 causes capacitor 74 to discharge periodically through diode 104 and resistor 106. As capacitor 74 is prevented from charging to the avalanche voltage of diac 76, diac 76 does not fire and the start circuit 100 is thus disabled.

At $T_2$, a fault condition develops in power supply 10', as for example when a short circuit occurs in the output. Pulse generator 60 shuts off, thereby decreasing the voltage $V_{22}$ on the secondary winding 22 of isolation transformer 18 to zero. As the drain of switch 16 is no longer periodically switched to ground, capacitor 74 is allowed to charge rather than discharge through disabling means 102. Thus, capacitor 74 is enabled to charge sufficiently to reach the avalanche voltage of diac 76, and the start circuit begins to oscillate. At $T_3$, the power supply is restarted. Note that in this embodiment there is no significant delay time between power supply shutdown and the operation of start circuit 100.

Figure 5:
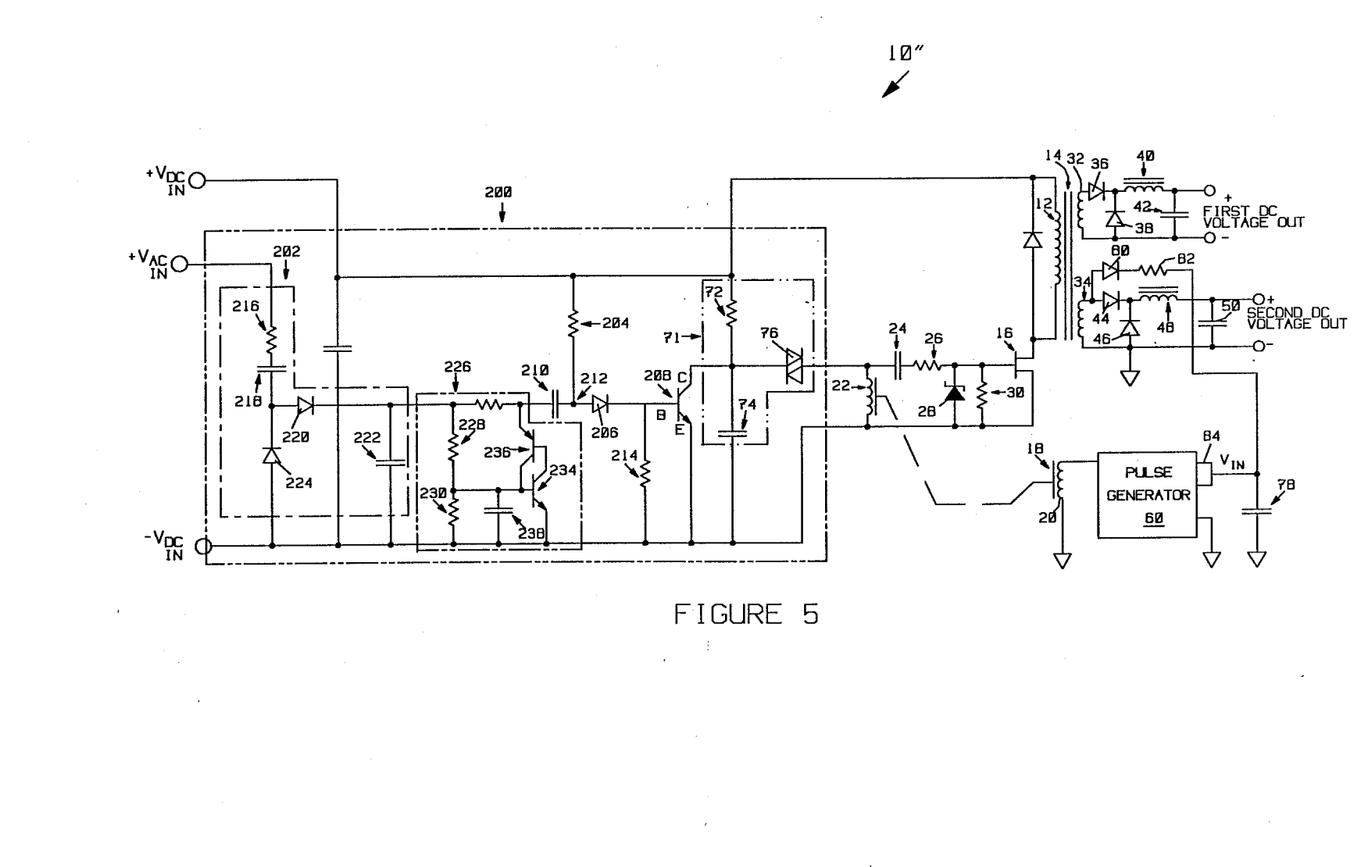
FIG. 5 is a diagram showing an alternative start circuit delay means and latch means according to the present invention.

FIG. 5 is a diagram showing another embodiment of a start circuit 200 for a power supply 10" according to the present invention. Components that are common to FIG. 1 and FIG. 5 are shown with the same number. This embodiment provides alternative delay means 202 for delaying operation of start circuit 200 after shutdown of power supply 10" for circuit fault or for other reasons. The delay allows any line sensing and switching circuitry to stabilize before attempting to restart power supply 10".

A further advantage of delay means 202 arises in universal power supply circuits in which circuit functions are automatically switched, depending on the input line voltage, thereby enabling use of the circuit in, e.g., American 120 volt or European 240 volt systems. It has been found that such automatic switching is preferably done prior to the start of the power circuit and involves the use of voltage doubling capacitors. These input capacitors are allowed to reach a settled voltage state, as a result of this delay means, prior to when the start circuit tries to restart the power supply. Moreover, noise caused by the running of the power supply, which could confuse the switching function of the universal circuit, is avoided.

The characteristics and operation of relaxation oscillator means 71, including resistor 72, capacitor 74, and diac 76, have been discussed above in regard to FIG. 1. During normal operation of power supply 10", current through a resistor 204 and diode 206 drives the base of a disabling transistor 208 which turns on, thereby short circuiting capacitor 74 of relaxation oscillator means 71 and disabling start circuit 200 from attempting start operations. The voltage on the right side of capacitor 210 at node 212 is the sum of the voltage drop of diode 206 and the base-emitter junction voltage of switch 208. Resistor 214 holds the base of transistor 208 to common ($-VDC$) in the absence of drive current.

Alternative delay means 202 includes a charge pump comprising resistor 216, capacitor 218, diode 220, capacitor 222, and diode 224. In operation, when AC power is initially turned on, an incremental amount of charge is coupled via resistor 216, capacitor 218, and diode 220, which is forward biased, to capacitor 222. When the top of resistor 216 becomes negative, as a function of the negative portions of the AC power waveform, diode 220 is back biased so that the current which charged capacitor 222 then charges capacitor 218 via diode 224 which is forward biased. Because capacitor 218 is thereby reset, when the top of resistor 216 again becomes positive, another incremental amount of charge is applied to capacitor 222 via diode 220. Thus, the voltage across capacitor 222 continues to rise in increments.

A latch means 226 includes a resistor 228 and a resistor 230 connected in series to form a voltage divider, a current limiting resistor 232, a transistor 234, and transistor 236. When capacitor 222 of alternative delay means 202 is charged to a sufficient voltage level, the resultant voltage on the voltage divider drives the base of transistor 234, turning it on. Transistor 234 then drives the base of transistor 236, thereby firing the latch and pulling the left side of capacitor 210 to ground. A noise decoupling capacitor 238 may be added to prevent false triggering of the latch. As the right side of capacitor 210 at this point is more negative than the left side 212, it is pulled below ground, causing the base of disabling transistor 208 to be undriven. Transistor 208 turns off, removing the short circuit across capacitor 74, and enabling relaxation oscillator means 71 to begin start operations as described above. Note that one of ordinary skill in the art may use an SCR for latch 226 in a manner as described above.

The operation of the embodiment of the present invention shown in FIG. 5, including alternative delay means 202 and latch means 226, may be described by reference to FIG. 5 and to the timing diagram of FIG. 6.

Figure 6:
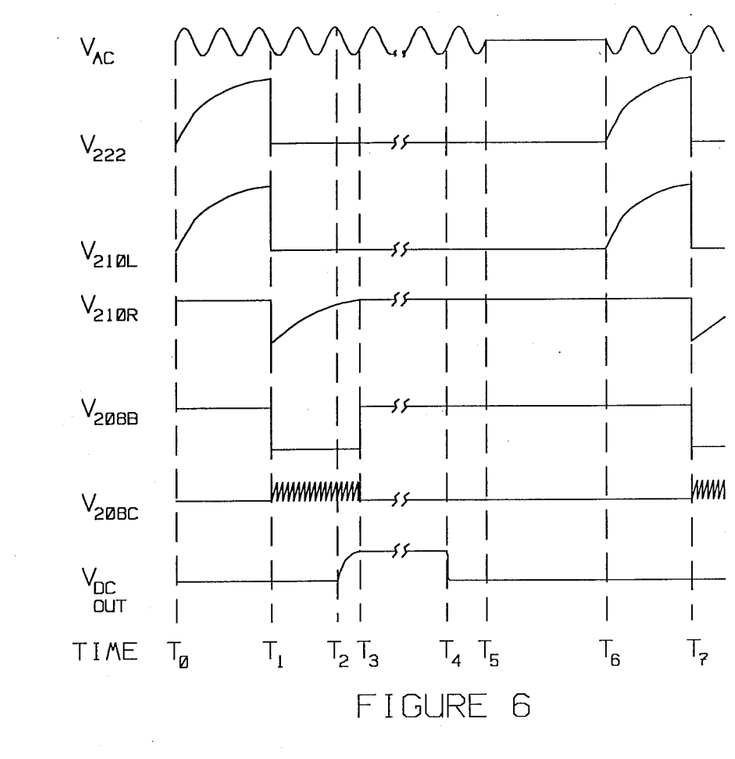
FIG. 6 is a timing diagram for the embodiment of the present invention shown in FIG. 5.

As shown in FIG. 6, with power supply 10″ off at $T_o$, an AC voltage is applied to start circuit 200. The charge pump voltage $V_{222}$ across capacitor 222 rises as charge is incrementally coupled to capacitor 222, as described above. The voltage $V_{222}$ across capacitor 222 is divided by the voltage divider resistors 228 and 230.

At $T_1$, the voltage $V_{222}$ has increased sufficiently to turn on transistor 234. Typically this turn-on voltage is 0.6 V. As described above, transistor 234 causes transistor 236 to turn on also, thereby firing latch means 226. The firing of latch means 226 causes the left side of capacitor 210 to go to ground, as seen at $V_{210L}$, thereby driving the voltage on the anode of diode 206 negative. This is because the voltage $V_{210L}$ on the side of capacitor 210 connected to the emitter of transistor 236 was equal to the voltage $V_{222}$ across capacitor 222 and the voltage $V_{210R}$ was held at the sum of the base-emitter voltage $V_{208B}$ of transistor 208 plus the voltage drop of diode 206. The result is that the base of transistor 208 becomes undriven and transistor 208 shuts off, thereby allowing start circuit 200 to start power supply 10″ between $T_1$ and $T_2$.

From $T_1$ to $T_2$ the voltage $V_{210R}$ on the right side of capacitor 210, at node 212, rises. At $T_3$ the voltage $V_{210R}$ has increased sufficiently to forward bias diode 206 and drive transistor 208, turning it on. This short circuits capacitor 74 of relaxation oscillator 71 and thereby disables start circuit 200. The power supply 10 then operates in normal mode from $T_3$ to $T_4$.

At $T_4$, a fault condition in the power supply, such as an output short circuit, has caused pulse generator 60 to shut off and output voltage VDC OUT to immediately drop to zero. When this occurs, latch means 226 remains on and power supply 10 cannot be restarted until the AC input voltage is removed, as shown at $T_5$.

The removal of AC voltage turns off the charge pump of delay means 202, thereby causing the base of transistor 234 of latch means 226 to become undriven as voltage $V_{234B}$ drops to zero. When transistor 234 turns off, the base of transistor 236 becomes undriven and it turns off. When AC input voltage is restored at $T_6$, the start cycle resumes.

The delay period enabled by alternative delay means 202 is represented in FIG. 6 by the interval $T_o$ to $T_1$. The time period $T_1$ to $T_3$ is of a selected length sufficient to allow starting of power supply 10 under normal conditions.

Figure 7:
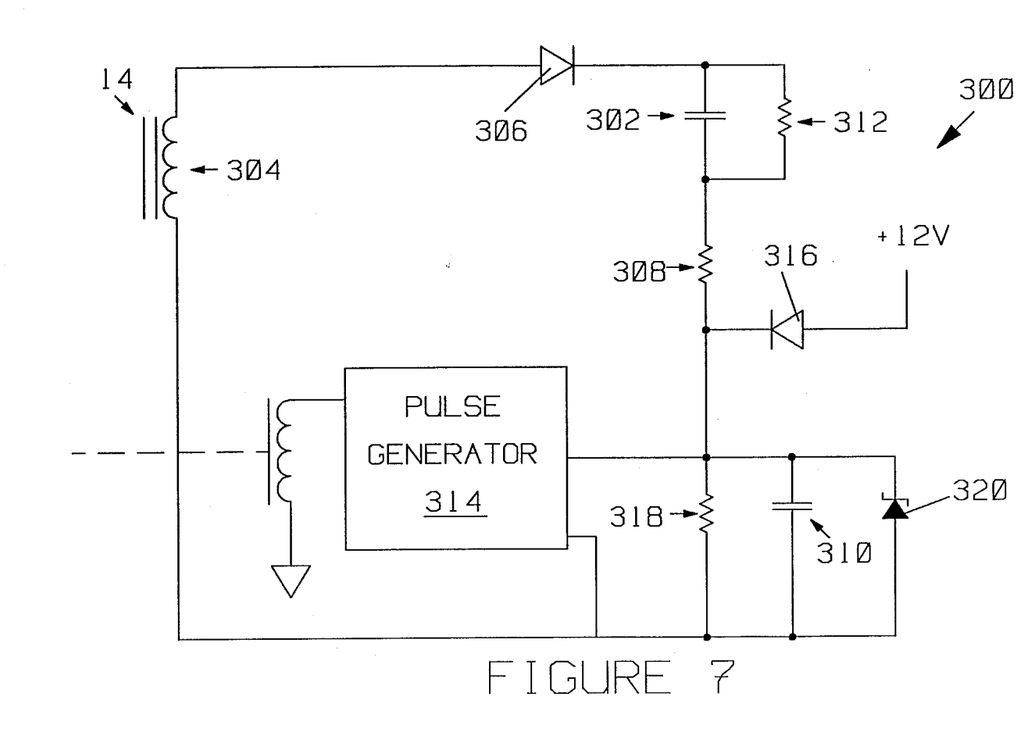
FIG. 7 is a diagram showing rapid start means according to the present invention.

FIG. 7 is a schematic diagram showing a rapid start means 300 according to the present invention. Shown in FIG. 7 is a partial schematic of the secondary side 300 of a power supply 10‴. At the initiation of start operations, a capacitor 302 is uncharged and thus acts as an AC short circuit. Transformer winding 304 preferably is a 12 volt winding on the power transformer 14 of power supply 10‴. Positive pulses from transformer winding 304 are coupled through a diode 306, capacitor 302, and a resistor 308 to a charge capacitor 310. The current pulses through capacitor 302 create a small charge on capacitor 302 which is discharged between pulses by discharge resistor 312 according to an RC time constant determined by resistor 312 and capacitor 302. When the charge on capacitor 310 reaches the necessary level, the operation of integrated circuit 314 can be started.

Because capacitor 302 acts as a short circuit during start operations and is kept discharged by resistor 312, starting capacitor 310 can be charged much more quickly with a much higher current that would otherwise be possible. Resistor 308 limits current through diode 306 and capacitor 302 during the start cycle. Diode 316 isolates integrated circuit 314 from the 12 volt rails of the power supply, shown as +12 V, which provide power during normal operations.

When power supply 10‴ is operating in normal mode, wide duty cycle pulses are applied to transformer winding 304. The top of capacitor 302 charges to peak voltage but, unlike the situation in start operations, capacitor 302 will not be discharged on each cycle by resistor 312. This is because, when power supply 12 is operating normally, the RC time constant set by resistor 312 and capacitor 302 is longer than the operating frequency of power supply 10. Capacitor 302 then becomes a high impedance in series with resistor 308 and limits current from transformer winding 304 to integrated circuit 314.

Resistor 318 may also be added to discharge capacitor 310 when the power supply is shut down. A zener diode 328 may be added to prevent the power to integrated circuit 314 from exceeding safe limits, typically 18–20 volts.

It is to be understood that although the preferred embodiments of the present invention have been illustrated and described, various modifications, alternatives, and equivalents thereof will become apparent to those skilled in the art, and accordingly, the scope of the present invention should be defined only by the appended claims and the equivalents thereof

What is claimed is:

1. In a DC/DC converter power supply including a DC voltage source, a power transformer including a primary winding and a secondary winding, rectifier and filter means connected to said secondary winding for generating an output DC voltage from the current output by said secondary winding, pulse generator means for generating a train of pulses of varying pulse width as a function of the present value of said output voltage, power switch means coupled to said primary winding such that when said power switch means closes, said DC voltage source is coupled across said primary winding, means for coupling said train of pulses to said power switch means, said pulses causing said power switch means to close for the duration of each said pulse, and means for coupling ongoing power to said pulse generator means once said pulse generator means begins operation, the improvement comprising start means responsive to the initiation of said DC voltage source for starting the operation of said pulse generator means, said start means comprising: relaxation oscillator means connected to said DC voltage source for periodically generating a start pulse at a predetermined frequency, means for coupling said start pulse to said power switch means, said start pulse causing said power switch means to close for a predetermined duration, means connected to said secondary winding for powering said pulse generator means from the energy coupled to said secondary winding by said switch means closures, disabling means for selectively disabling said relaxation oscillator means when said pulse generator means begins to be powered by said ongoing power; and delay means coupled to said disabling means for delaying electrical removal of said disabling means from said start means for a preselected period after shutdown of said power supply.

2. The DC/DC power supply of claim 1 wherein said relaxation oscillator means includes a capacitor, means for charging said capacitor, and means for discharging said capacitor when the voltage across said capacitor reaches a predetermined breakdown voltage level.

3. The DC/DC power supply of claim 2 wherein said disabling means includes a transistor connected in parallel with said capacitor of said relaxation oscillator means and electrically coupled to said pulse generator means such that said transistor is turned on when said pulse generator means is powered by said ongoing power, thereby short circuiting said capacitor of said relaxation oscillator means and disabling said start means.

4. The DC/DC power supply of claim 3 wherein said delay means includes a resistor and a second capacitor, said resistor having a first side connected to the base of said transistor of said disabling means and a second side connected to a first side of said second capacitor, a second side of said second capacitor being connected to the emitter of said transistor of said disabling means, said delay means being electrically coupled to said pulse generator means such that said second capacitor is charged when said pulse generator means is generating said train of pulses and such that said second capacitor is discharged at a predetermined rate through said resistor when said pulse generator means ceases to generate said train of pulses, said transistor being caused to remain on until the charge on said second capacitor decreases to a point where there is insufficient drive to keep said transistor on.

5. In a DC/DC converter power supply including a DC voltage source, a power transformer including a primary winding and a secondary winding, rectifier and filter means connected to said secondary winding for generating an output DC voltage from the current output by secondary winding, pulse generator means for generating a train of pulses of varying pulse width as a function of the present value of said output voltage, power switch means coupled to said primary winding such that when said power switch means closes, said DC voltage source is coupled across said primary winding, means for coupling said train of pulses to said power switch means, said pulses causing said power switch means to close for the duration of each said pulse, and means for coupling ongoing power to said pulse generator means once said pulse generator means begins operation, the improvement comprising start means responsive to the initiation of said DC voltage source for starting the operation of said pulse generator means, said start means comprising: relaxation oscillator means connected to said DC voltage source for periodically generating a start pulse at a predetermined frequency, said relaxation oscillator means including a capacitor and means for discharging said capacitor when the voltage across said capacitor reaches a predetermined breakdown voltage level; means for coupling said start pulse to said power switch means, said start pulse causing said power switch means to close for a predetermined duration; means connected to said secondary winding for powering said pulse generator means from the energy coupled to said secondary winding by said switch means closures; and disabling means for selectively disabling said relaxation oscillator means when said pulse generator means begins to be powered by said ongoing power, said disabling means including a diode having its anode connected to the electrical junction of said relaxation oscillator means and said power switch means, a disabling switch means for disabling said start means coupled across said capacitor and a resistor-capacitor circuit means connected between the cathode of said diode and said disabling switch means such that the time constant of said resistor-capacitor circuit means couples a voltage to said disabling switch means sufficient to turn on said switch and thereby disable said relaxation oscillator means during the time said power switch means is switched on by said train of pulses.

6. In a DC/DC converter power supply including a DC voltage source generated from a rectified AC voltage source, a power transformer including a primary winding and a secondary winding, rectifier and filter means connected to said secondary winding for generating an output DC voltage from the current output by said secondary winding, pulse generator means for generating a train of pulses of varying pulse width as a function of the present value of said output voltage, power switch means coupled to said primary winding such that when said power switch means closes, said DC voltage source is coupled across said primary winding, means for coupling said train of pulses to said power switch means, said pulses causing said power switch means to close for the duration of each said pulse, and means for coupling ongoing power to said pulse generator means once said pulse generator means begins operation, the improvement comprising start means responsive to the initiation of said DC voltage source for starting the operation of said pulse generator means, said start means comprising: relaxation oscillator means connected to said DC voltage source for periodically generating a start pulse at a predetermined frequency, means for coupling said start pulse to said power switch means, said start pulse causing said power switch means to close for a predetermined duration, means connected to said secondary winding for powering said pulse generator means from the energy coupled to said secondary winding by said switch means closures, disabling means for selectively disabling said relaxation oscillator means when said pulse generator means begins to be powered by said ongoing power; and delay means coupled to said disabling means for delaying electrical removal of said disabling means from said start means for a preselected period after shutdown of said power supply, said delay means includes charge pump means connected to said AC voltage source and to said disabling means, said charge pump including a charge pump resistor connected to said AC voltage source and to a first charge pump capacitor connected to the anode of a first charge pump diode and to the cathode of a second charge pump diode, the cathode of said first charge pump diode being connected to a first side of a second charge pump capacitor, the anode of said second charge pump diode being connected to a second side of said second charge pump capacitor, such that when the voltage on the end of said charge pump resistor connected to said AC voltage source is increasing, said second charge pump diode is back biased and said first charge pump diode is forward biased such that current flows through said first charge pump diode to charge said second charge pump capacitor and when the end of said charge pump resistor connected to said AC voltage source is going negative, said first charge pump diode is back biased and said second charge pump diode is forward biased such that current flows from said second charge pump capacitor through said second charge pump diode to charge said first charge pump capacitor.

7. The DC/DC power supply of claim 6 further including latch means connected to said charge pump means and to said disabling means for preventing restart of said power supply after said power supply has shut down until said AC voltage source has been turned off and then reapplied to said start circuit.

8. The power supply of claim 7 wherein said latch means comprises a first latch resistor in series with a second latch resistor, said resistors forming a voltage divider in parallel with said second charge pump capacitor, a current limiting resistor connected to said first latch resistor, and first and second latch transistors, the emitter of said first latch transistor being connected to said current limiting resistor, the collector of said first latch transistor being connected to the base of said second latch transistor, the base of said first latch transistor being connected to the collector of said second latch transistor, the emitter of said second latch transistor being connected to said second side of said second charge pump capacitor.

9. In a DC/DC converter power supply including a DC voltage source, a power transformer including a primary winding and a secondary winding, rectifier and filter means connected to said secondary winding for generating an output DC voltage from the current output by said secondary winding, pulse generator means for generating a train of pulses of varying pulse width as a function of the present value of said output voltage, power switch means coupled to said primary winding such that when said power switch means closes, said DC voltage source is coupled across said primary winding, means for coupling said train of pulses to said power switch means, said pulses causing said power switch means to close for the duration of each said pulse, and means for coupling ongoing power to said pulse generator means once said pulse generator means begins operation, the improvement comprising start means responsive to the initiation of said DC voltage source for starting the operation of said pulse generator means, said start means comprising: relaxation oscillator means connected to said DC voltage source for periodically generating a start pulse at a predetermined frequency, means for coupling said start pulse to said power switch means, said start pulse causing said power switch means to close for a predetermined duration, means connected to said secondary winding for powering said pulse generator means from the energy coupled to said secondary winding by said switch means closures, disabling means for selectively disabling said relaxation oscillator means when said pulse generator means begins to be powered by said ongoing power; and- rapid start means for reducing the time period between the initiation of start attempts by said start means after shutdown of said power supply, said rapid start means comprising:

a start diode connected to a secondary winding of said transformer;

a start capacitor connected to the cathode of said start diode;

a start resistor in series with said start capacitor; and a supply capacitor in series with said start resistor, such that said train of pulses from said pulse generating means causes high current pulses to flow from said secondary winding through said start diode, said start capacitor and said start resistor charging said supply capacitor rapidly during operation of said start means, and such that said rapid start capacitor limits current to said supply capacitor when said pulse generator means begins operation.

10. The power supply of claim 9 further including a discharge resistor in parallel with said start capacitor for discharging said start capacitor during operation of said start means.

* * * * *